May 23, 1950  E. L. LANE  2,508,864

PICTURE AND MOTIF FINDER

Filed Dec. 11, 1946

INVENTOR
ERIK LENNART LANE

BY Otto Munk
HIS ATTY

Patented May 23, 1950

2,508,864

UNITED STATES PATENT OFFICE 2,508,864

PICTURE AND MOTIF FINDER

Erik Lennart Lane, Stockholm, Sweden

Application December 11, 1946, Serial No. 715,491
In Sweden November 22, 1946

1 Claim. (Cl. 88—1.5)

The present invention refers to a direct-aiming finder which may be used to advantage also as an angle finder, and which in both cases renders a well-defined, exceedingly luminous image, which is properly positioned both laterally and vertically. The finder differs from previously known finders, first, by the fact that in its capacity as a combined finder it will always give a large and clear image which is properly positioned both laterally and vertically, and, second, by the fact that in spite of its being a mirror reflex finder with two reflecting surfaces set at an angle to each other it will only give the desired image without all those mirror reflexes that are produced in mirrors forming an angle between them.

The finder according to the invention is principally distinguished by the feature that it is provided with two reflecting surfaces forming preferably an angle of 45° between them, and by the fact that a device is provided at the exit opening of the rays to fix the position of the eye relatively to the reflecting surfaces which have been adapted according to the following description. The reflecting surfaces are preferably constituted by angularly positioned mirrors or by the reflecting surfaces of a prism.

Figure 1:
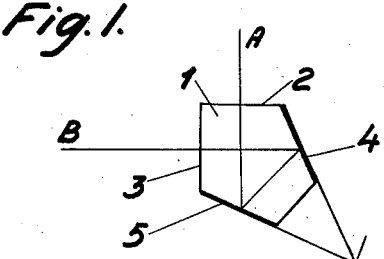
Figure 2:
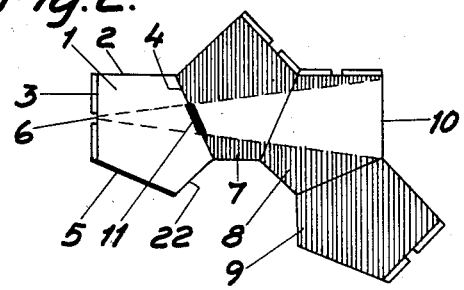
Figure 3:
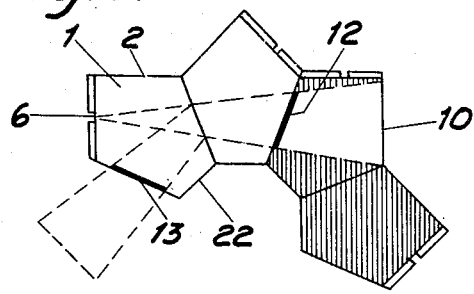
Figure 4:
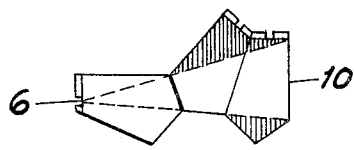
Figure 5:
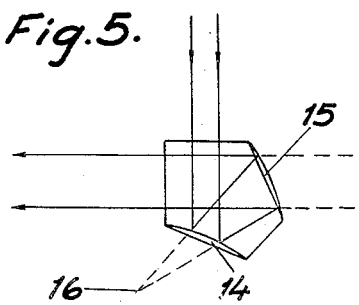

The invention is illustrated by a few forms of embodiment in the accompanying diagrammatic drawing, wherein Fig. 1 is a cross section of a 45°-prism. Fig. 2 illustrates the successive reflections in the surfaces of the prism and the adaptation thereof. Fig. 3 is a corresponding view showing a further adaptation. Fig. 4 shows how the prism should be cut in accordance with the invention. Fig. 5 shows a modified form of embodiment.

In the drawing, 1 designates an ordinary prism with the entrance surface 2, the exit surface 3, and the reflecting surfaces 4 and 5. According to Fig. 2, the exit surface 3 has a device 6 with a peep sight for the fixing of the position of the eye relatively to the reflecting surfaces and the desired image.

This latter condition is related to the adaptation of the reflecting surfaces, whereby non-relevant images are screened off. With angularly set reflecting surfaces, a series of images are produced in each of them. In the present case, a series of images of the actual prism are produced in each of the reflecting surfaces 4 and 5. If the prism is looked into through the surface 3, then the first, the second, and the third image of the actual prism may be observed in the reflecting surface 4. These images have been denoted by 7, 8 and 9, respectively. The second image of the entrance opening of the prism is designated by 10. Provided it is desired to see the very image 10, when the observing device 6 is locked through, and not the other images of the prism, the reflecting surface 4 should be so adapted that if straight lines are conceived as extended from the observing device 6 to the image 10, such lines will limit the reflecting surface. The above-named image was selected with respect to the fact that the same shows the motif properly positioned both laterally and vertically, and by the fact that it has its plane parallelling the exit opening. The limited reflecting surface produced in the adaptation is designated by 11. The hatched portions in the drawing show what parts of the images are thus screened off.

Fig. 3 shows the masking of the reflecting surface 5 which is first hit by the incoming ray. Here, too, the hatched portions show which parts of the images are thus screened off, that is to say, how all images after the first image 12 of the adapted reflecting surface are screened off save for the image 10. The reflecting surface 5 should be adapted so that if lines are conceived as extended from the observing device 6 to the image 10, such lines will limit the first image of the adapted reflecting surface, which is denoted by 13.

As will appear from Fig. 3, certain parts of the finder may be cut away without disadvantage, so that the sides 2, 13 and 22 are moved in parallel with themselves, until the sides 2, and 22 reach the conceived lines and the side 13 is displaced correspondingly. Fig. 4 shows an example of embodiment, where the prism has been cut in this manner already in its manufacture. Here, the finder has an entrance opening for the light rays of the same size as in the finders according to Figs. 2 and 3; the previously mentioned image 10 of the entrance opening is nearer to the observing device 6, however, whereby the angle at which the motif is observed becomes considerably larger, while the whole finder is at the same time considerably smaller in spite of an entrance opening of the same size.

The device for the fixing of the position of the eye relatively to the mirror surfaces may preferably be made from semi-transparent material, such as a mask with an opening therein or with a portion of the semi-transparent mask made wholly transparent.

The mirror surfaces may be plane or curved. If the two mirror surfaces are plane, an image is obtained without any enlargement or reduction thereof, and without any errors in tracing or any distortion of colors. This finder is suitable in scientific photography and in color photography. Fig. 1 shows the path of light in a finder with plane mirror surfaces. A denotes the incoming ray, which is first subjected to total reflection in the mirror surface 5, and then in the mirror surface 4, in a manner such that the outgoing ray B is at right angles or approximately so to the incoming ray A.

If one of the mirror surfaces or both of them are curved, the mirror surface which is first hit by the incoming ray is preferably spherically convex, whereby a reduced image and a large image field are obtained. By varying the focal distance of the convex mirror surface, an image field suitable for different objectives is obtained. But inasmuch as the image of the motif becomes small in proportion to the increase of the image field, the image will have to be enlarged, and this is effected, if the mirror surface which is last hit by the incoming ray is spherically concave. The focal distance of the convex mirror surface shall be such that the virtual image produced by the convex mirror surface is in or inside the focal plane of the concave mirror surface. The path of light in a finder with curved mirrors is shown in Fig. 5. The incoming rays first hit the convex mirror surface 14, which reflects and diverges the rays, and then the concave mirror surface 15, which reflects and converges them. If the virtual image 16 of the motif, which is produced in the convex mirror surface, is in the focal plane of the concave mirror, which is taken to be the case in the drawing, the outgoing rays will be parallel or nearly parallel, an enlarged virtual image being thus obtained at a great distance.

The curved mirror surface may be replaced by a plane mirror surface in combination with a lens. A negative lens and a plane mirror surface render, the same as the convex mirror surface, a reduced virtual image with a large image field, and with different focal distances of the lens a variation of the magnitude of the image field is likewise obtained. The lens is preferably placed either immediately in front of the mirror surface or at the entrance opening of the finder for the light rays. At an enlargement of the reduced virtual image the concave mirror surface may be replaced by a positive lens combined with a plane mirror surface, an enlarged virtual image being then also obtained at a great distance. The lens is preferably placed either immediately in front of the mirror surface or at the entrance opening of the finder for the light rays. Here, it must be attended to, however, that the image produced by the convex mirror surface or the combination plane mirror-negative lens is in or inside the focal plane of the concave mirror surface or of the positive lens.

The reflecting surfaces may be arranged on collapsible mirrors.

Having now described my invention, what I claim as new and desire to secure by Letters Patent is:

A view finder for cameras, comprising a member having a view opening to pass rays from said view, a pair of reflecting surfaces disposed in the path of said rays and angularly disposed with respect to each other and with respect to the path of the rays from said opening and so arranged that the doubly reflected rays cross the path of the incoming rays, a member having a peep sight opening for fixing the position of the eye through which the doubly reflected rays pass, at least one of said reflecting surfaces conforming exactly in area to the lines of sight extending from said peep sight opening to the limiting edges of said view opening, whereby extra reflected images are eliminated from the system and a single image only is observed.

ERIK LENNART LANE.

REFERENCES CITED

The following references are of record in the file of this patent:

UNITED STATES PATENTS

| Number | Name | Date |
| --- | --- | --- |
| 624,517 | Mercer | May 9, 1899 |
| 2,323,005 | Bertele | June 29, 1943 |
| 2,340,623 | Simon | Feb. 1, 1944 |

FOREIGN PATENTS

| Number | Country | Date |
| --- | --- | --- |
| 366,674 | France | Aug. 3, 1906 |
| 196,301 | Germany | Mar. 12, 1908 |
| 399,853 | France | May 7, 1909 |
| 556,783 | Germany | Jan. 28, 1933 |
| 627,361 | Germany | May 13, 1936 |